May 10, 1932. S. ISLER 1,857,959
CURVE PLOTTING SYSTEM
Filed Sept. 23, 1930 2 Sheets-Sheet 2
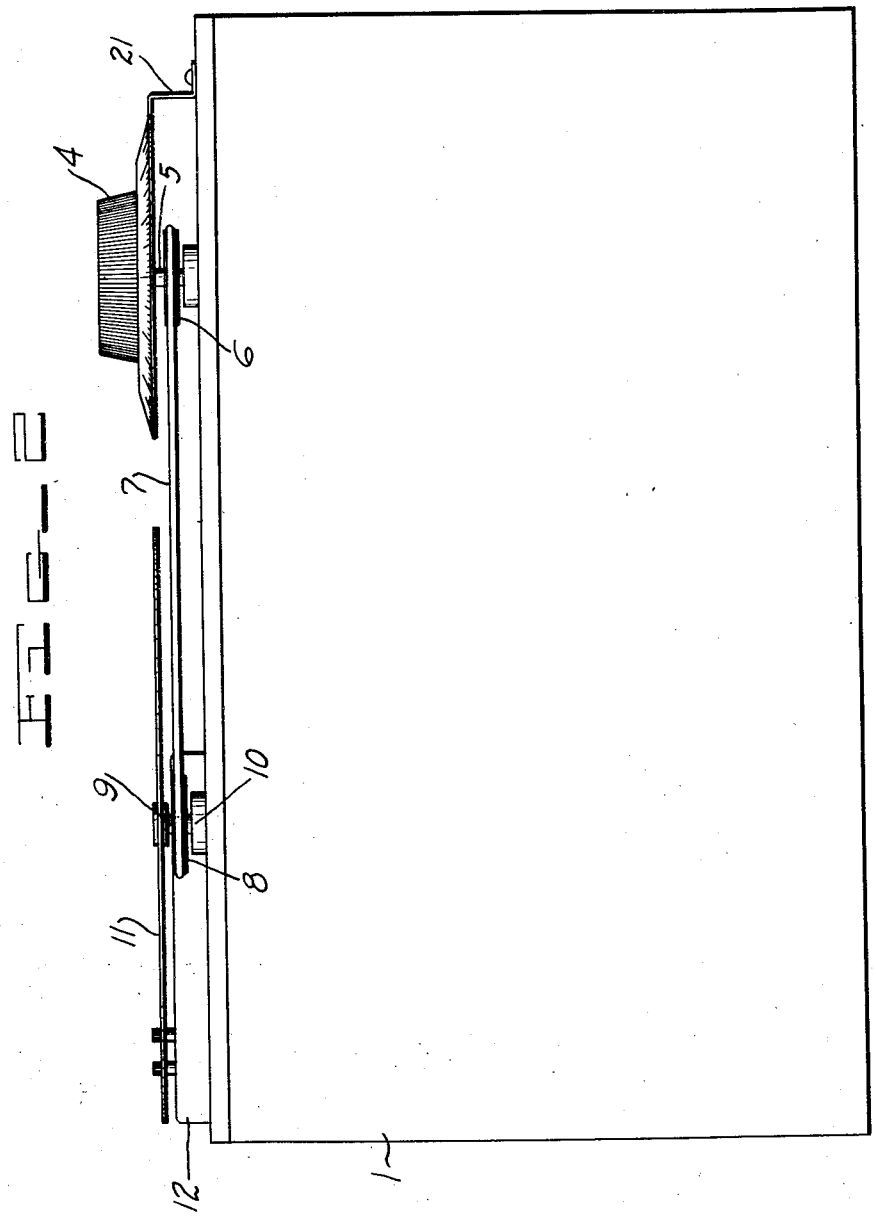
INVENTOR
Samuel Isler.
BY
ATTORNEY Patented May 10, 1932

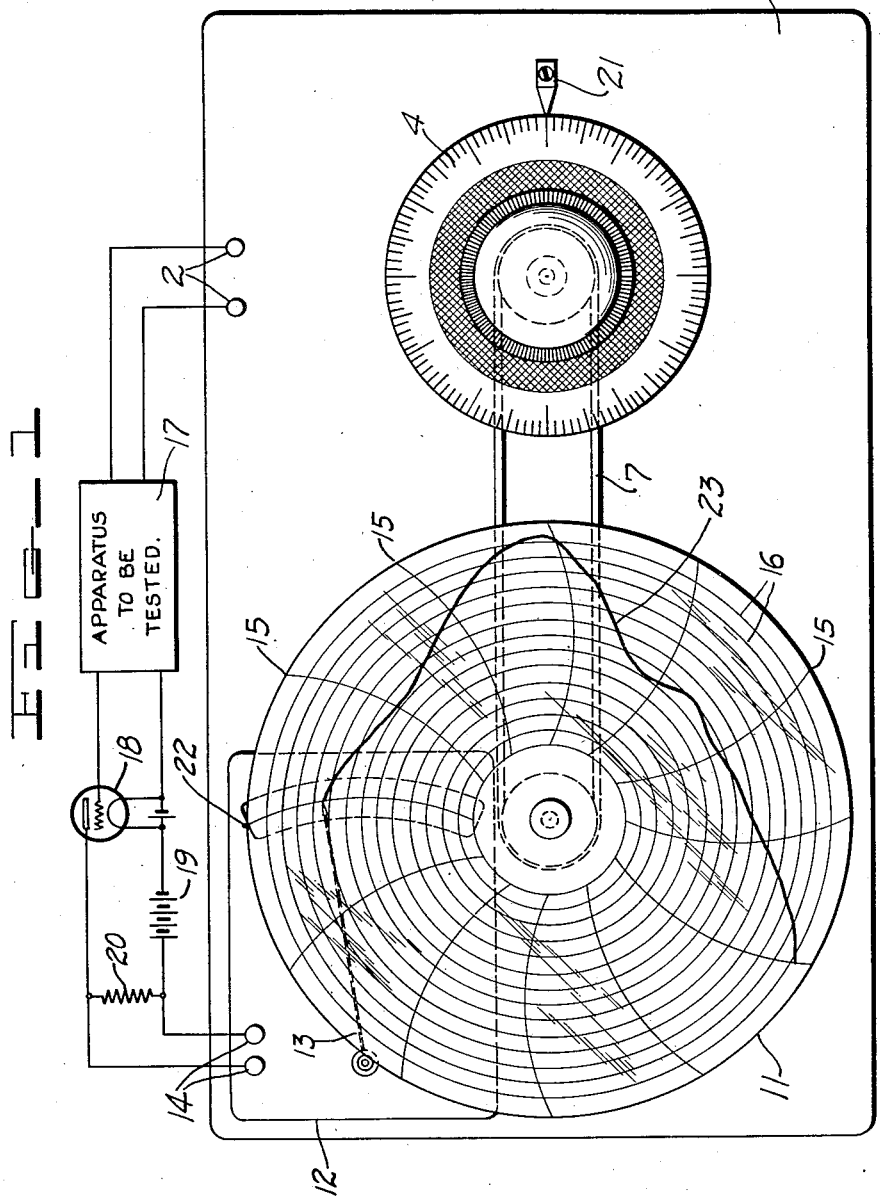

1,857,959

UNITED STATES PATENT OFFICE

SAMUEL ISLER, OF EAST ORANGE, NEW JERSEY, ASSIGNOR TO WIRED RADIO, INC., OF NEW YORK, N. Y., A CORPORATION OF DELAWARE

CURVE PLOTTING SYSTEM

Application filed September 23, 1930. Serial No. 483,852.

My invention pertains in general to systems for plotting curves and specifically relates to a curve plotting system for indicating the amplitude of an alternating current with reference to its frequency.

One of the objects of my invention consists in providing means for quickly and efficiently determining and recording the electrical characteristics of an electrical organization.

Another object of my invention consists in providing a system for quickly and accurately plotting curves of the amplitude of an alternating current with reference to its frequency.

Another object of my invention consists in producing a system for plotting frequency and amplitude of an alternating current in terms of polar coordinates by means of an electrical indicating device and a rotatable frequency changer.

I accomplish these and other desirable objects in a novel curve plotting system employing a source of alternating current, an electrical indicating device, and a rotatable plotting member cooperating therewith.

In the drawings which accompany and form part of this specification, and in which like reference numbers designate corresponding parts throughout:

Fig. 1 is one embodiment of the curve plotting system of my invention showing the arrangement of mechanical parts as well as electrical circuits employed therewith.

Fig. 2 is a side elevation of the mechanical organization of the embodiment of Fig. 1.

Referring to the drawings, and particularly to Fig. 1, an oscillator 1, having output terminals 2, is provided. The oscillator 1 is a unit for producing oscillations comprising an ordinary thermionic tube and associated resonant oscillatory circuits including inductance and capacitance. Such an organization for producing oscillations is well known in radio art and is therefore not shown in detail. A dial 4 having radial graduations thereon is secured to a shaft 5 which extends within the oscillator 1 (see Fig. 2). This shaft 5 is internally connected to a variable inductance or capacitance of the oscillatory circuit contained within the oscillator unit so that the frequency of the oscillations produced by the oscillator 1 can be controlled by manually rotating the dial 4. A pulley wheel 6 is rigidly secured to the shaft 5 and frictionally engages with a belt 7. The belt 7 engages with another pulley wheel 8, similar to the pulley wheel 6, and which is secured to a spindle 9 rotatably mounted in bearing member 10. The disk 11 is rigidly secured to the spindle 9 at a point above the pulley 8. The disk 11 is composed of a transparent material, such as glass or celluloid.

Referring further to Fig. 1, an electrical indicating device 12 is mounted on top of the oscillator 1 beneath the disk 11. The indicating device 12 is preferably a voltmeter and is provided with a movable needle 13 adapted to indicate, in a well known manner, the voltage applied at the input of the indicating device. The needle 13 is positioned on the oscillator 1 in a manner such that it describes an arc substantially along a radius of the disk 11.

The disk 11 is provided with opaque polar coordinate lines including the radial lines 15 and the concentric annular lines 16.

Wires are provided from the oscillator output terminals 2 to apparatus to be tested 17. The apparatus to be tested 17 may be any electrical organization having characteristics to be tested with reference to oscillating input currents of different frequencies, for example, a filter network. The output from the apparatus to be tested 17 is connected to a space discharge tube 18, as shown. The output circuit of the space discharge tube 18 is connected to terminals 14 of an indicating device 12. A "B" battery 19 and resistance 20 are provided in this output circuit as shown.

Since the relative angular position of the dial 4 determines the circuit constants of the oscillator 1 and the corresponding frequency of the output current provided to the output terminals 2, it is evident that the frequency of this current will be indicated by the position of the radial lines 15 on the disk 11 with reference to the end of the needle 13, inasmuch as the disk 11 will follow the rotation of the dial 4. The frequency of the oscillatory current output of oscillator 1 can be reckoned by observing the position of the radial graduations of the dail 4 with reference to the index 21 mounted on the oscillator 1. Zero amplitude current through the apparatus to be tested 17 will be indicated when the needle 13 is at a point 22 at the outer edge of the disk 11. Increase in amplitude is indicated by movement of the needle 13 in a direction towards the center of the disk 11. It will be evident, then, that the needle 13 indicates amplitude of the oscillating current produced by the oscillator along the radiant lines 15, while frequency is indicated by the angular position of the annular line 16, with reference to needle 13.

The operation of my curve plotting system will be apparent from the following:

When it is desired to graphically determine the transmission response of an electrical organization with reference to the frequency of an input oscillatory current, the electrical organization is introduced into that part of the circuit of Fig. 1 indicated by the block 17 designated "apparatus to be tested." An oscillatory current is then applied from the output terminals 2 of the oscillator 1. The amplitude of the output from the apparatus to be tested 17 will then be indicated by the needle 13 and can be recorded on the disk 11. The dial 4 is then rotated to change the resonance constants of the oscillator 1 and thereby alter the frequency of the oscillator current applied to the apparatus to be tested. As the dial 4 is turned, thereby changing the frequency, the disk 11 will also be turned thereby rotating the annular lines 16 past the needle 13. As the disk 11 is rotated the needle 13 will move substantially along the radius of the disk 11 to indicate, at progressive frequencies, the amplitude of the current output, from the apparatus to be tested. The successive points on the disk indicated by the pointer 13, as the disk is rotated, may be plotted by marking with a pencil or pen on the disk 11 the successive positions of the extremity of the needle 13, to produce a curve such as curve 23. This curve will then be a record of the characteristics of the tested apparatus. It will of course be obvious that a master curve of a standard testing unit could be plotted upon the disk 11 and that other apparatus could be quickly compared with the standard by noting deflections of the needle 13 from the curve of the standard unit.

I have found, in experiments, such a system for plotting curves to be highly efficient and practical for purposes of testing electrical apparatus. Although I have shown a preferred embodiment of my invention, I do not wish to be limited thereto except in so far as pointed out in the appended claims.

What I claim as new and original and desire to secure by United States Letters Patent is:

1. A curve plotting system comprising, a source of current, mechanically movable means adapted to control said current, a plotting member having two-dimensional coordinate lines thereon, said plotting member being adapted to be moved in the direction of one of said coordinates by said mechanically movable means; and an electrical indicating device under control of said current and having a movable needle positioned in a manner adapted to move with reference to said plotting member in the direction of the other of said coordinates.

2. A curve plotting system comprising, a source of oscillating current including a resonant circuit having inductance and capacitance, means adapted to alter the resonance product of said circuit including a rotatable member, a rotatable plotting disk, said disk and said rotatable member being mechanically coupled; and an electrical device having a needle adapted to indicate current amplitude, said needle being adapted to describe an arc substantially along the radii of said disk.

3. A curve plotting system comprising, a source of alternating current, means adapted to control the frequency of said current, a plotting member having two-dimensional coordinate lines thereon, an electrical device having a movable needle adapted to indicate current amplitude, said needle being movable with reference to said plotting member in a manner adapted to indicate the amplitude of said current along one dimension of said coordinates; and means adapted to move said plotting member in accordance with changes of frequency of said alternating current in a manner adapted to indicate by reference along the other dimension of said coordinates the relation of the amplitude of said current to the frequency of said current.

4. A curve plotting system comprising, a source of alternating current, means adapted to control the frequency of said alternating current, a plotting member having polar coordinate lines thereon, an electrical device having a needle adapted to move along the radii of said polar coordinate lines to indicate current amplitude, and means adapted to angularly move said plotting member about the origin of said polar coordinate lines, said movement having definite relation to changes in the frequency of said alternating current.

5. A curve plotting system comprising, a source of alternating current, means adapted to control the frequency of said alternating current including a rotatable member, a rotatable disk having polar coordinate lines thereon, said disk being mechanically coupled to said rotatable member; and an electrical device having a movable needle adapted to indicate current amplitude, said needle being adapted to move along the radii of said polar coordinate lines.

SAMUEL ISLER.